United States Patent
Schnipke et al.

(10) Patent No.: US 8,715,497 B2
(45) Date of Patent: May 6, 2014

(54) IN-TANK FLUID FILTER WITH PLASTIC RETAINER

(75) Inventors: Travis Schnipke, Findlay, OH (US); Michael E. Yost, Tiffin, OH (US); Gary L. Rickle, Wharton, OH (US); Joseph Wendahl, Baton Rouge, LA (US)

(73) Assignee: Kuss Filtration Inc., Findlay, OH (US)

( * ) Notice: Subject to any disclaimer, the term of this patent is extended or adjusted under 35 U.S.C. 154(b) by 0 days.

(21) Appl. No.: 13/409,493

(22) Filed: Mar. 1, 2012

(65) Prior Publication Data

US 2012/0248021 A1    Oct. 4, 2012

Related U.S. Application Data

(60) Provisional application No. 61/468,673, filed on Mar. 29, 2011.

(51) Int. Cl.
*B01D 35/027*    (2006.01)

(52) U.S. Cl.
USPC ............ 210/172.2; 210/172.3; 210/232; 210/416.4

(58) Field of Classification Search
None
See application file for complete search history.

(56) References Cited

U.S. PATENT DOCUMENTS

| | | | | |
|---|---|---|---|---|
| 2,484,192 A | * | 10/1949 | Squiller | 285/305 |
| 2,689,146 A | * | 9/1954 | Werner | 403/281 |
| 2,913,950 A | * | 11/1959 | Tinnerman | 411/436 |
| 3,007,726 A | * | 11/1961 | Parkin | 403/372 |
| 5,049,271 A | * | 9/1991 | Cain | 210/250 |
| 5,395,520 A | * | 3/1995 | Ito et al. | 210/172.4 |
| 5,547,568 A | * | 8/1996 | Sasaki | 210/172.4 |
| 5,607,578 A | * | 3/1997 | Ohkouchi et al. | 210/172.4 |
| 5,639,367 A | * | 6/1997 | Ohzeki et al. | 210/315 |
| 5,665,229 A | | 9/1997 | Fitzpatrick et al. | |
| 5,795,468 A | * | 8/1998 | Reising et al. | 210/172.4 |
| 6,220,454 B1 | | 4/2001 | Chilton | |
| 6,464,872 B1 | * | 10/2002 | Honda | 210/416.4 |
| 6,471,863 B2 | * | 10/2002 | Kojima | 210/416.4 |
| 6,613,227 B2 | * | 9/2003 | Rickle | 210/243 |
| 6,716,341 B2 | * | 4/2004 | Nguyen et al. | 210/167.08 |
| 6,736,273 B2 | | 5/2004 | Chiga | |
| 6,833,070 B2 | * | 12/2004 | Fischer et al. | 210/232 |
| 6,964,265 B2 | * | 11/2005 | Iwamoto | 123/510 |
| 6,998,043 B2 | * | 2/2006 | Fischer et al. | 210/232 |
| 7,478,729 B2 | * | 1/2009 | Sato et al. | 210/491 |
| 8,173,013 B2 | * | 5/2012 | Sato et al. | 210/172.4 |

(Continued)

OTHER PUBLICATIONS

Definitions of "unitary" and "integral" as downloaded from Dictionary.com by the Examiner on Sep. 16, 2013; two pages.*

(Continued)

*Primary Examiner* — Robert James Popovics
(74) *Attorney, Agent, or Firm* — Brinks Gilson & Lione (57) ABSTRACT

An in-tank fluid filter has a filter body made of porous material and a plastic outlet port attached to the filter body for connecting the filter to a pump. A plastic retainer is integrally formed on the outlet port, the retainer comprising a tab extending in a plane perpendicular to the flow axis, the tab having a first surface proximate the pump and a second surface remote from the pump, the tab having an aperture extending from the first surface to the second surface with an effective cross-section at the first surface that is larger than the post cross-section and that is reduced toward the second surface to an effective cross-section that is smaller than the post cross-section.

19 Claims, 6 Drawing Sheets

(56) References Cited

U.S. PATENT DOCUMENTS

| | | | |
|---|---|---|---|
| 8,372,278 B1* | 2/2013 | Nguyen et al. | 210/172.2 |
| 2002/0023418 A1* | 2/2002 | Kojima | 55/379 |
| 2002/0162790 A1* | 11/2002 | Chiga | 210/461 |
| 2003/0010692 A1* | 1/2003 | Sato et al. | 210/172 |
| 2003/0132156 A1* | 7/2003 | Rickle | 210/416.4 |
| 2004/0129626 A1* | 7/2004 | Fischer et al. | 210/416.4 |
| 2004/0168971 A1* | 9/2004 | Sato et al. | 210/486 |
| 2004/0222143 A1* | 11/2004 | Kojima et al. | 210/416.4 |
| 2005/0006300 A1* | 1/2005 | Sato et al. | 210/416.4 |
| 2005/0098489 A1* | 5/2005 | Fischer et al. | 210/172 |
| 2005/0150826 A1* | 7/2005 | Sato et al. | 210/488 |
| 2005/0173329 A1* | 8/2005 | Iwamoto | 210/232 |
| 2009/0039011 A1* | 2/2009 | Sato et al. | 210/491 |
| 2009/0120858 A1* | 5/2009 | Kojima et al. | 210/167.08 |
| 2012/0248021 A1* | 10/2012 | Schnipke et al. | 210/232 |

OTHER PUBLICATIONS

TrueLock Bolt™ "Positively Locked—Precisely Where You Want!"—downloaded by Applicants from truelockbolt.com, dated Jul. 23, 2013; 4 pages.*

* cited by examiner

IN-TANK FLUID FILTER WITH PLASTIC RETAINER

CROSS REFERENCE TO RELATED APPLICATION

This application claims the benefit of U.S. provisional application entitled IN-TANK FUEL FILTER WITH PLASTIC RETENTION FEATURE, application No. 61/468,673, filed on Mar. 29, 2011, the entirety of which is hereby incorporated by reference.

TECHNICAL FIELD OF THE INVENTION

The present invention relates generally to in-tank fluid filters for installation on in-tank pump assemblies for fluid systems, for example fuel-supply systems, brake systems, emission systems, steering systems, transmission systems, windshield washer systems, cooling systems, lubrication systems, or other fluid systems, and more specifically to an in-tank fluid filter having a retainer that grips a retention post on a pump for securing the filter to the pump.

BACKGROUND OF THE INVENTION

Current in-tank fluid filters may incorporate a metal retention ring that is pressed onto a plastic outlet port of the filter. The metal ring includes a plurality of metal barbs that serve to connect to and grip a retention post on an in-tank pump. An example of such a metal retention ring is disclosed for an in-tank fuel filter in U.S. Pat. No. 5,665,229. The metal retention ring adds to manufacturing costs by requiring additional human labor and material.

SUMMARY OF THE INVENTION

The present invention eliminates the additional costs of a metal retention ring by providing a plastic retainer integrated into a plastic port that is attached to the filter for connecting the filter to a pump inlet. An in-tank fluid filter has a filter body made of porous material with an attached plastic outlet port for connecting the filter to a pump inlet fitting. The outlet port has a flow axis defined by an intended direction of fluid flow from the filter to the pump. A plastic retainer is formed on the outlet port with a tab extending in a plane perpendicular to the flow axis and an aperture through the tab for receiving a pump retention post. The aperture is wider near the surface of the tab that is near the pump than at the surface remote from the pump. The aperture has an effective cross-section that varies and is defined as the largest cross-section mathematically similar to the retention post that can be drawn inside the aperture without intersecting any of the plastic material of the tab. The effective cross-section corresponds to a post cross-section that can be inserted at a given position without deforming the retainer. Thus, the aperture can be dimensioned to have an effective cross-section at the surface near the pump that is larger than the post cross-section.

In one aspect of the invention, the effective cross-section may be continuously reduced toward the surface facing away from the pump so that the effective cross-section becomes smaller than the post cross-section. When the retention post of the pump is inserted into the aperture, the plastic material is deformed where the effective cross-section is smaller than the post cross-section. This gives the retainer a firm grip of the retention post without establishing a positive lock.

The resulting deformation may be at least partially elastic. The plastic retainer will serve to grip and secure tightly the plastic filter outlet port to the pump retention post without requiring a change in design to existing pump designs.

For ease of assembly, the aperture may have a tapered or beveled, for example frustoconical, centering guide at the surface from which the retention post is inserted into the aperture.

Inside the aperture, a plurality of inward lugs may be arranged to reduce the effective cross-section of the aperture. The lugs may be tapered to effect different effective cross-sections in different axial positions.

The lugs may each have a contour that, without deformation of the lugs makes a point-shaped contact with the retention post. The three or more lugs remove all lateral degrees of freedom for securing the retention post in the retainer. These lugs may, for instance be shaped like partial cones, including partial truncated cones.

Alternatively, the lugs may have a contour that is adapted to the retention post and thus contacts the retention post over a wider angular range. Then two lugs are sufficient to remove the lateral degrees of freedom.

In one embodiment, the plastic retainer is unitarily formed with the filter's outlet port. The plastic retainer can be made of any non-metallic material, for example a thermoplastic material. The material is preferably resistant to the fluid to be filtered. For example, in a fuel filter the material is preferably fuel resistant and dimensionally stable in fuel. If used in a different fluid, the material is preferably resistant to the respective fluid and retains its shape in the respective fluid. One example of a suitable plastic material for a retainer of a fuel filter includes, but is not limited to, polyoxymethylene (POM). To increase the rigidity of the retainer, additives such as glass fibers and/or glass spheres can be added to the plastic material.

DETAILED DESCRIPTION OF THE DRAWINGS

All figures serve illustrative purposes only and are not intended to limit the scope of the present invention. The drawings may not be true to scale and serve to emphasize certain details of the various aspects of the invention.

Figure 1:
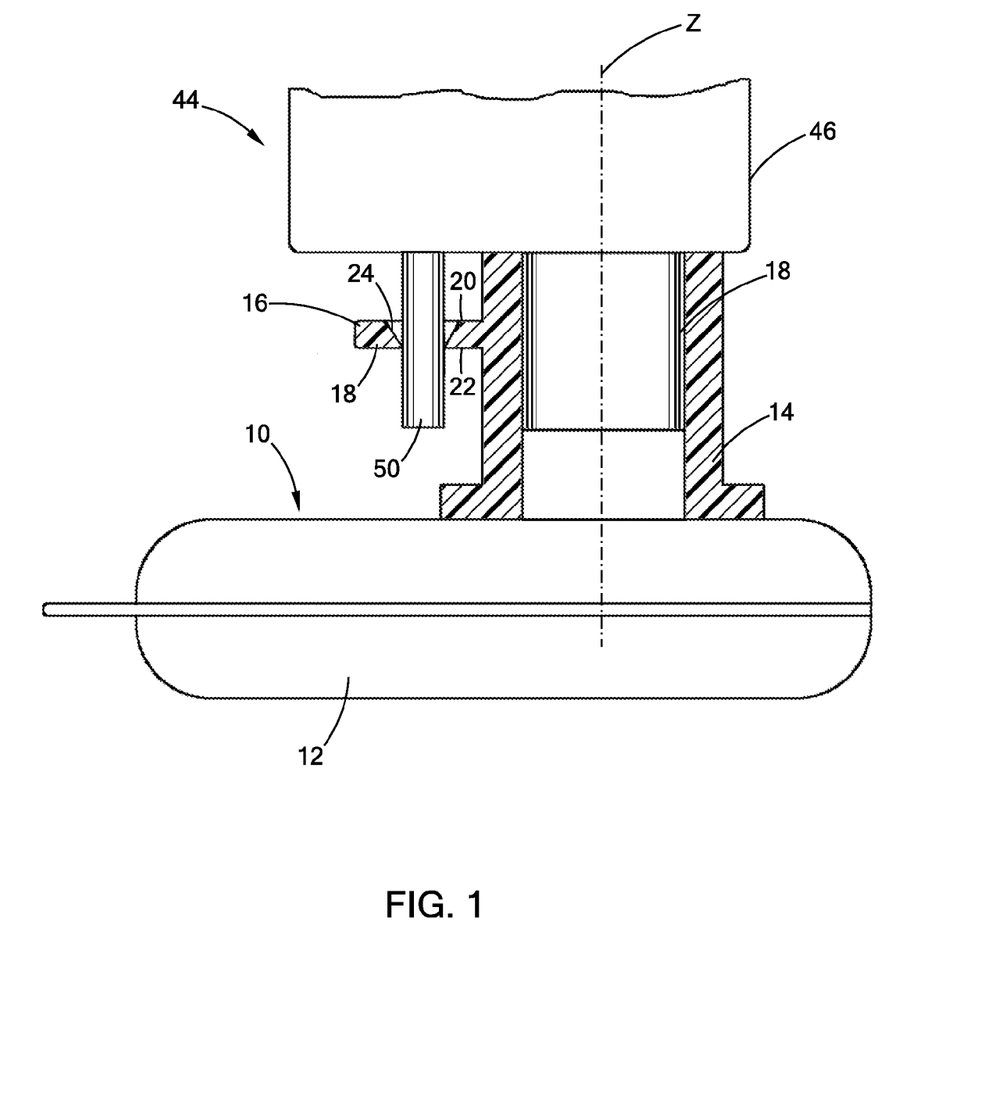
FIG. 1 schematically illustrates a connection between an in-tank pump and an in-tank fluid filter using a retainer according to the present invention.

FIG. 1 shows a schematic view of a fluid pump assembly 44 with an attached fluid filter 10. The fluid pump assembly 44 includes a fluid pump housing 46, a cylindrical inlet fitting 48, and a retention post 50. The cylindrical inlet fitting 48 extends from the pump housing 46 toward the filter 10 and defines a central flow axis Z indicating a general direction along which fluid flows from the filter 10 through the inlet fitting 48 into the pump housing 46. In the following, the term "axial" indicates the direction of the flow axis.

In the shown example, the retention post 50 is cylindrical and is secured to the bottom portion of the pump housing 46. The retention post 50 extends parallel to the flow axis Z, radially spaced from the inlet fitting 48.

The filter 10 has a filter body 12, an outlet port 14 attached to the filter body 12, and a retainer 16 unitarily formed on the outlet port 14. The filter body is made of a porous woven or non-woven textile envelope filled with a suitable filter medium for filtering the fluid. The outlet port 14 has a size and shape adapted to complement the inlet fitting 48 of the pump assembly 44. Usually, the inlet fitting 48 is cylindrical, but any other cross-section can be accommodated in a corresponding mold for the outlet port 14.

The retainer 16 is shaped as a tab 18 substantially extending radially from the outlet port 14. The tab 18 has two major surfaces 20 and 22 extending perpendicular to the flow axis Z. One surface 20 faces the pump assembly 44, and the other surface 22 faces the filter body 12, i.e. faces away from the pump assembly 44. The tab 18 has an aperture 24 from surface 20 to surface 22 located at such a distance from the outlet port 14 that it coincides with the radial location of the retention post 50 when the inlet fitting 48 of the pump assembly 44 is inserted into the outlet port 14 of the filter 10. FIG. 1 indicates schematically that the aperture 24 has larger cross-section near the first surface 20 than near the second surface 22. Further details relating to the outlet port 14 and the retainer 16, especially concerning the aperture 26, become evident in the subsequent description of individual exemplary embodiments.

Figure 2:
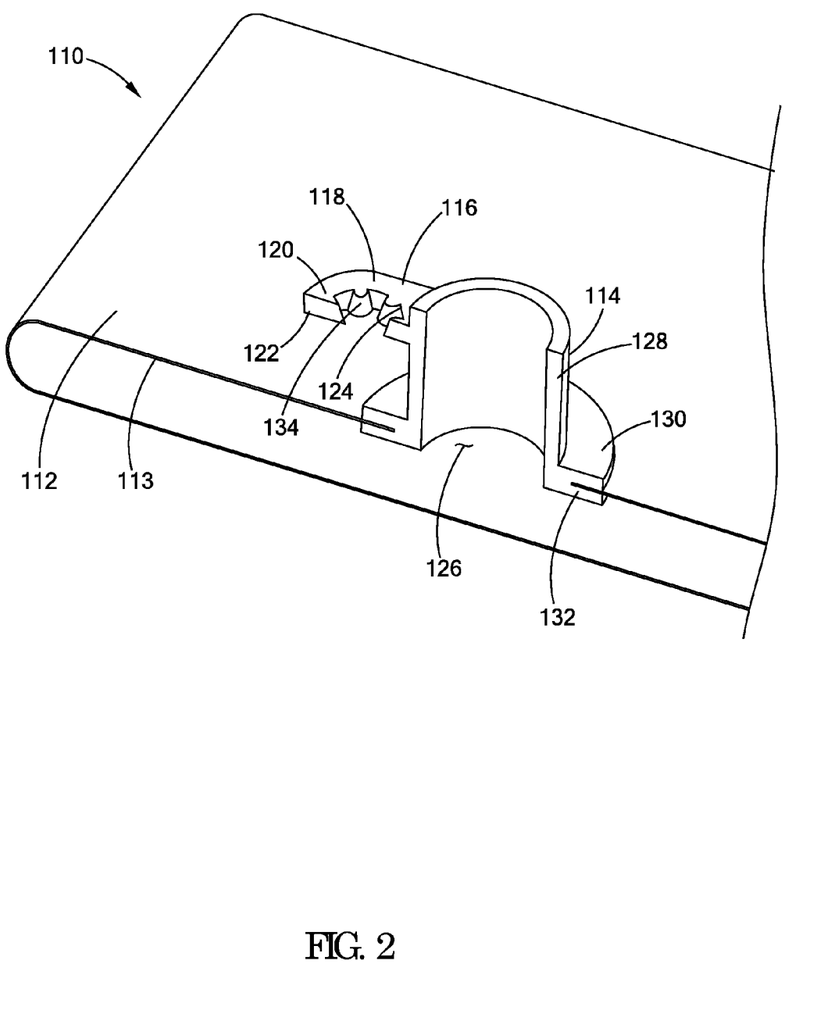
FIG. 2 is a partial cross-sectional view of a first illustrative embodiment of an in-tank fluid filter with a plastic retainer unitarily formed on the plastic filter outlet port of the in-tank fluid filter.

FIG. 2 illustrates a cross-sectional view of a first exemplary embodiment of a filter 110. A filter body 112 of the filter 110 is represented by a filter envelope 113 made of a suitable porous textile material. Filter material disposed inside the filter envelope 113 is not shown for simplicity of the drawing. The filter envelope 112 has a circular outlet opening 126 establishing a fluid connection between the interior of the filter envelope 113 and the interior of an outlet port 114 attached to the filter body 113.

The cross-sectional view of FIG. 2 reveals how the outlet port 114 is attached to the filter envelope 113. The outlet port 114 has a cylindrical tubular portion 126 with a central flow axis Z and adapted to be connected to an inlet fitting of a pump as illustrated in FIG. 1. On one end of the tubular section, an outer annular collar 130 and inner annular collar 132 form a dual flange lining the periphery of the outlet opening 126 inside and outside the filter envelope 113. Accordingly, the edge of the outlet opening 126 is secured between the outer collar 130 and the inner collar 132. The outer and inner collars 130 and 132 may be unitarily molded or assembled from two parts. They may be affixed to the filter envelope 113 by various suitable processes, including but not limited to insert injection molding, heat, mechanical fasteners, and fluid resistant adhesive.

Figure 9:
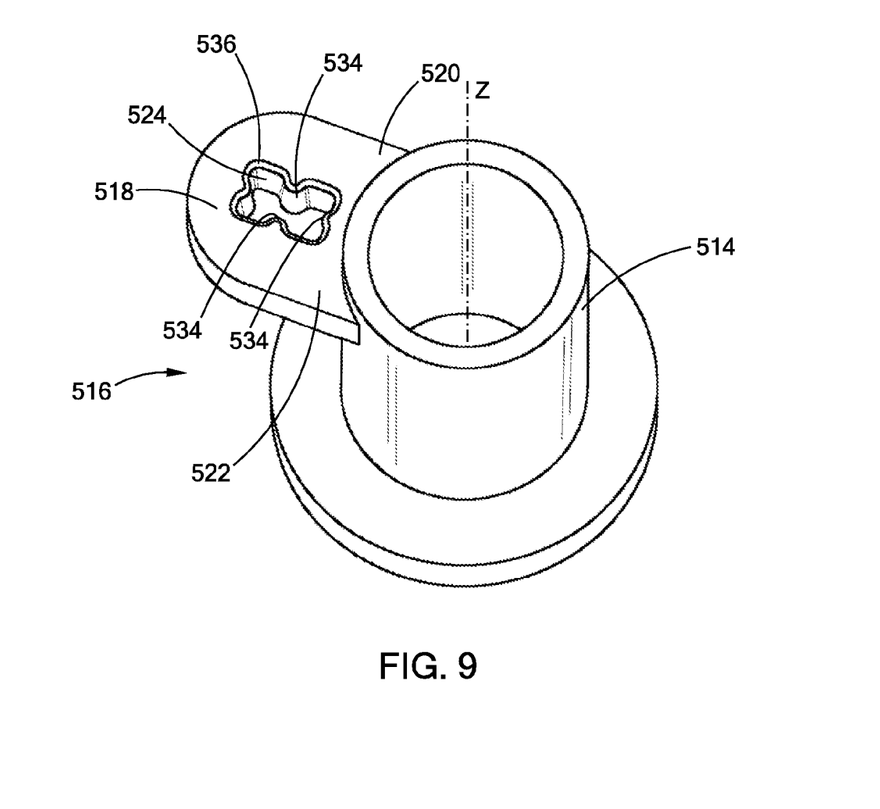
FIG. 9 illustrates an embodiment of a plastic retainer integrally formed on the plastic filter outlet port of the in-tank fluid filter configured for a retention post viewed from the side of the fluid pump.

Attached to the tubular portion is a retainer 116 with a tab 118. The tab 118 protrudes radially from the tubular portion 128 and is unitarily molded with the tubular portion 128 and the inner and outer collars 130 and 132. The tab 118 has an aperture 124 extending a first major surface 120 facing away from the filter envelope 113 to a second major surface 122 facing the filter envelope 113. The depicted aperture is adapted to a cylindrical retention post. FIGS. 9-11 show examples in which the retention post has a different shape.

Viewed in a direction parallel to the flow axis Z, the aperture 124 has an outer circular perimeter with several lugs 134 protruding radially inward from the circular perimeter of the aperture 124.

Figure 3:
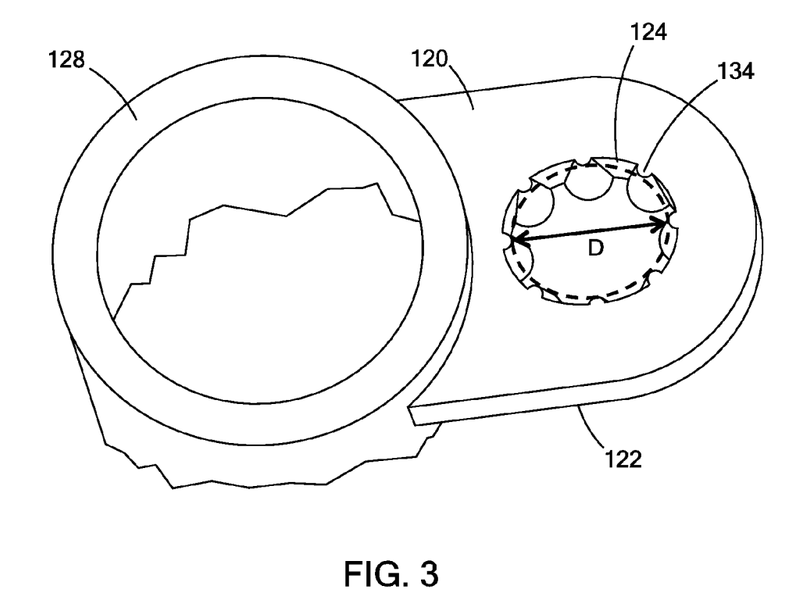
FIG. 3 shows a detail view of the plastic retainer shown in FIG. 2 viewed from the side of the fluid pump.
Figure 4:
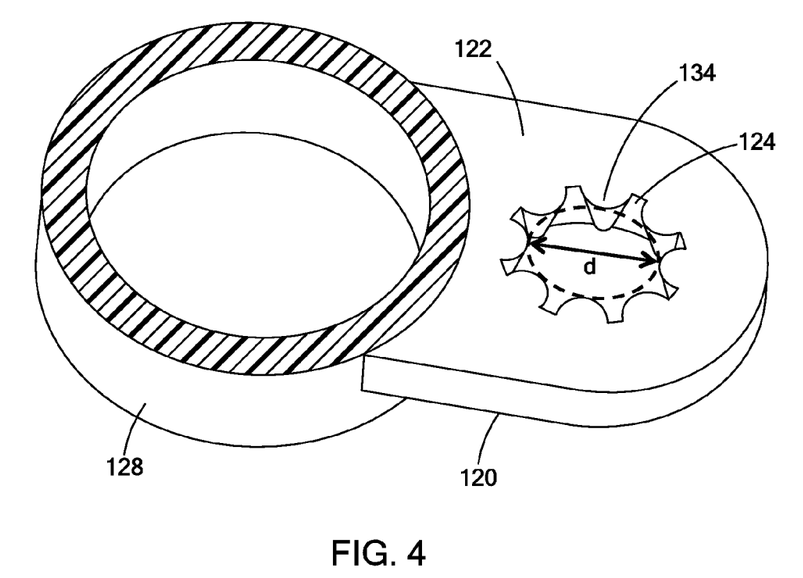
FIG. 4 shows a detail view of the plastic retainer shown in FIG. 2 viewed from the side of the filter body.

FIGS. 3 and 4 show partial views of the outlet port 114 of FIG. 2 to provide further details of the aperture 124. FIG. 3 shows a portion of the outlet port 114 viewed from the top of FIG. 2, which after installation is the location of a fluid pump as shown in FIG. 1. The aperture 124 of the shown example has eight lugs 134 protruding radially inward from the basically circular outer perimeter. Each of the lugs 134 has the shape of a partial, truncated cone with a virtual apex of each cone located outside the tab 118 on the side of the first major surface 120 of the tab 118. The protruding lugs 134 effectively reduce the unobstructed cross-section of the aperture 124. A circle tangentially touched by the lugs 134 at the first major surface 120 is indicated by a broken line. The circle has an effective diameter D defining an effective cross-section at the first major surface 120, corresponding to a retention post cross-section that can be inserted into the aperture 124 at the first major surface 120 without deforming the lugs 134, i.e. the cross-section of the largest unobstructed circle at the first major surface. For retention posts of a different shape, the effective cross-section has a shape mathematically similar to the retention post cross-section, which means that the effective cross-section and the post cross-section may have a different scale, but identical proportions. This relationship will be explained in more detail in connection with FIGS. 10a-10c and 11a-11c.

In FIG. 4, a circle tangentially touched by the lugs 134 at the second major surface 120 is indicated by a broken line. As evident from FIG. 4, the corresponding effective diameter d at the second major surface is smaller than the effective diameter D at the first major surface. This reduction in effective diameter from D to d is the result of the conical expansion of the lugs 134 from the first major surface 120 toward the second major surface 122. The lugs 134 are dimensioned to provide an effective diameter D that is greater than the diameter of the retention post to be inserted into the aperture 124. The effective diameter d, on the other hand, is smaller than the diameter of the retention post. Thus, when the retention post is inserted into the aperture 124, the lugs 134 are deformed, beginning at an axial position where the post diameter is equal to the effective diameter. The deformed lugs 134 grip the post securely without the need to establish a positive lock, especially if the resulting deformation is at least partially elastic.

The number and shape of the lugs 134 can vary. The extent to which the retention post diameter exceeds the effective diameter d will also increase the grip and the insertion force. It depends on an individual application to find an optimum retainer material and lug constellation adapted to the specific situation.

A suitable material for a plastic used to manufacture the outlet port unitarily 114 formed with the retainer 116 may be a thermoplastic material that is injection-molded into the desired shape. One preferred thermoplastic material suitable for the application is polyoxymethylene (POM). Glass fibers or glass spheres can be added to the material for structural reinforcement.

In deviation of the embodiment shown in FIGS. 2 through 4, it is not necessary that lugs 134 extend through the entire tab 118. Without affecting the function of the retainer, the aperture 124 may have straight portions or sections of varying effective diameters on either axial side of the lugs 134 that are wider than the diameter of the assigned retention post.

Figure 5:
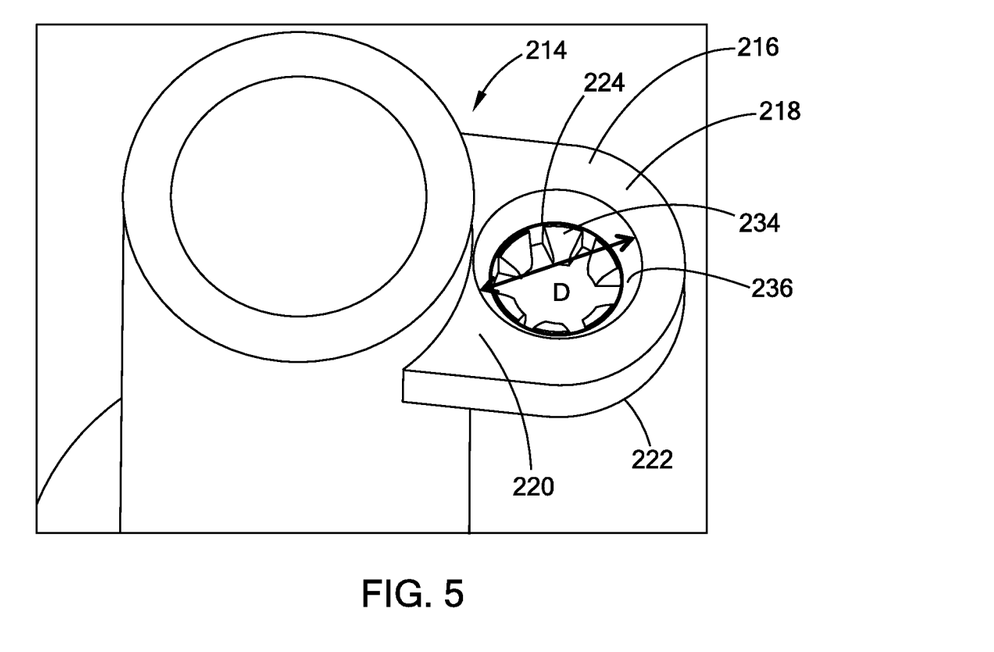
FIG. 5 illustrates a second embodiment of a plastic retainer integrally formed on the plastic filter outlet port of the in-tank fluid filter viewed from the side of the fluid pump.
Figure 6:
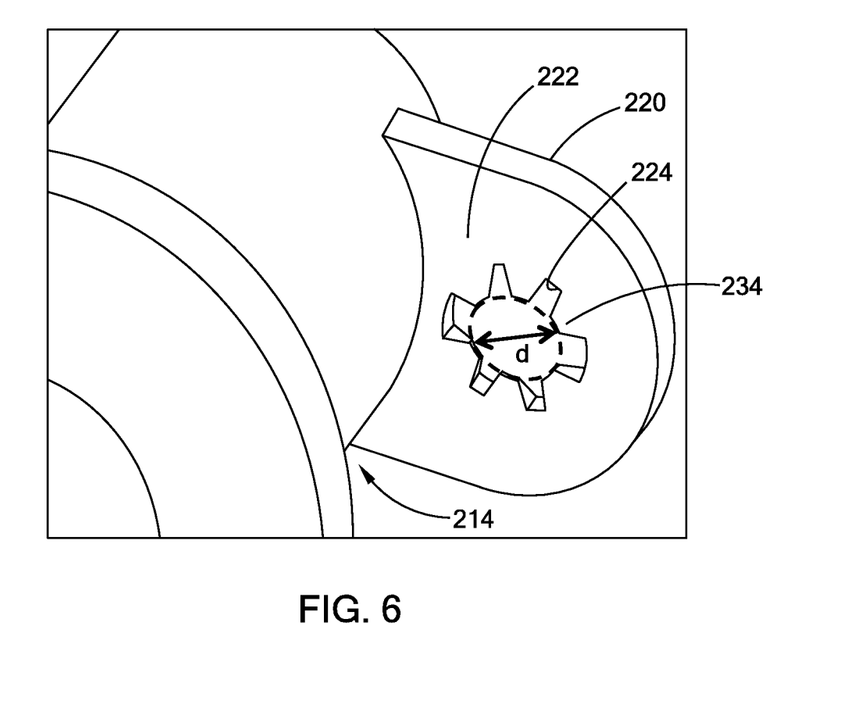
FIG. 6 shows the embodiment of FIG. 5 viewed from the side of the filter body.

FIGS. 5 and 6 provide partial views of a second illustrative embodiment of a plastic retainer 216 having a tab 218 integrally formed with a plastic outlet port 214 of an in-tank filter. The tab 218 includes an axial aperture 224 with six lugs 234 arranged on the outer perimeter for achieving an adequate grip on the pump retention post. In the illustrated embodiment, the lugs 234 are shaped as wedge-like trapezoidal projections. Because this embodiment is adapted for a cylindrical retention post, the effective cross-section can be defined by the effective diameter.

Notably, the lugs 234 do not extend along the entire axial thickness of the tab 218. Starting at the first major surface 220, the aperture 224 has a conical or funnel-shaped centering guide 236 with a circular cross-section. Because the lugs are located at a distance from the first major surface 220, the effective diameter D at the first major surface 220 is the diameter of the centering guide 236 in that location. The effective diameter decreases as the centering guide 236 narrows toward the second major surface 222. The centering guide 236, however, is not configured to grip the retention post so that in all axial locations of the centering guide 236, the effective diameter of the aperture is greater than the diameter of the retention post. Adjacent to the centering guide 236, between the centering guide 236 and the second surface, the lugs 234 further reduce the effective diameter to a resulting effective diameter d due to their wedge-like shape creating a radially inward slope toward the second major surface 222.

As evident from FIG. 6, the lugs 234 create the effective diameter d near the second surface 222 that is smaller than the effective diameter D at the first major surface 220. As mentioned above, the narrowest effective diameter d need not coincide with the second major surface 222. Advantageously, it is located at a distance from the first major surface, such that the effective diameter D at the first major surface is greater than the post diameter and continuously or gradually reduced to the smallest effective diameter d.

Figure 7:
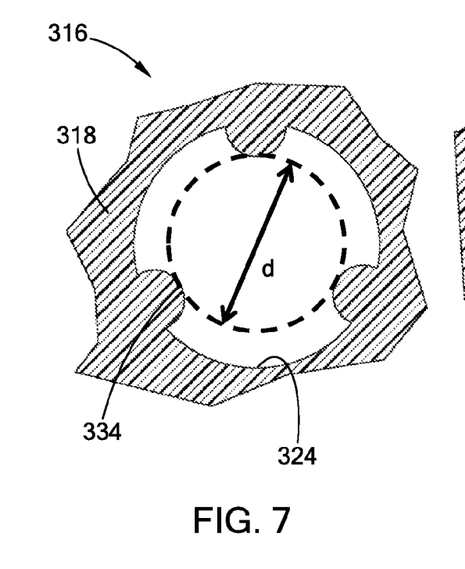
FIG. 7 schematically shows an illustrative example of an alternative arrangement of lugs.
Figure 8:
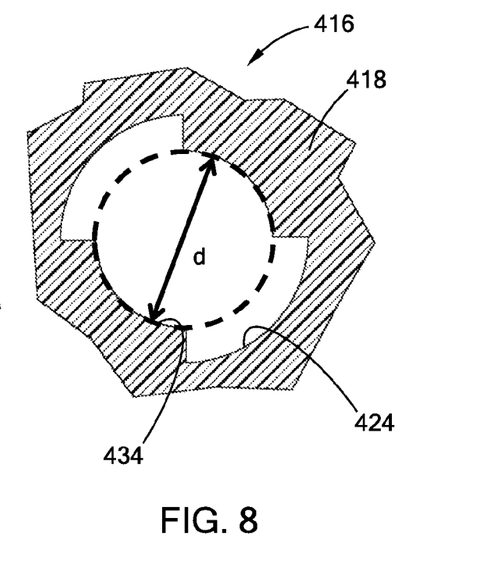
FIG. 8 schematically shows another illustrative example of an alternative arrangement of lugs.

FIGS. 7 and 8 give alternative examples of apertures 324 and 424 with a reduced number of lugs 334 and 434, respectively. The apertures 324 and 424 are provided in retainers 316 and 416 with tabs 318 and 418 that can replace any of the tabs shown in the preceding figures. It should be understood that the variations shown in the figures are not exhaustive and are only indicative of the vast multitude of dimensioning options for the tabs without leaving the scope of the present invention.

In the tab 318 of FIG. 7, three lugs 334 are distributed around the perimeter of the aperture 324. Viewed from an axial direction, each lug 334 has a contour of a partial circle protruding from the perimeter of aperture 324 radially inward.

A circle drawn inside the aperture 324 tangentially touching the lugs 334 defines the smallest effective diameter d representing the diameter of a post that can be inserted into the aperture 324 without deforming the lugs 334. As described previously, the effective diameter d is chosen to be slightly smaller than the diameter of a retention post intended to be inserted into the aperture 324. Due to their circular contour, the lugs 334 have a point-shaped contact with the circle indicating the effective diameter d. Thus, to eliminate all degrees of freedom for a lateral movement of a post inserted into the aperture 324, it is preferable to choose at least three lugs 334 where the lugs 334 only have a point-shaped contact with the effective diameter d. Such an arrangement will reliably center the retention post inside the aperture 324.

On the other hand, tab 418 of FIG. 8 has lugs 434 radially protruding into the aperture 424 that have a contour adapted to the perimeter of the circle having the effective diameter d. Accordingly, each of the lugs 434 establishes a line-shaped contact with the circle indicating the effective diameter d. In this instance, two lugs 434 are sufficient to reliably center a retention post because the retention post cannot slide in any radial direction due to the shape of the lugs 434 is adapted to the shape of the retention post and "hug" the retention post.

The integrated plastic retainer can be universally used on various pump assemblies and allows for a high degree of flexibility in retention design and effectiveness by customized dimensioning of the aperture 24, 124, 224, 324, and 424 and the corresponding lugs 134, 234, 334, and 434.

The plastic retainer serves to grip and tightly secure the plastic filter outlet port to the pump retention post. The plastic retainer can be made of any non-metallic material, for example a thermoplastic. For use in a fuel tank, the material is preferably is fuel resistant and dimensionally stable in fuel. Other plastics may be used depending on the particular application (such as brake systems, emission systems, steering systems, transmission systems, windshield washer systems, cooling systems, or other fluid systems). One example of a suitable plastic material for fuel filters includes, but is not limited to, polyoxymethylene (POM). To increase the rigidity of the retainer, additives such as glass fibers or glass spheres can be added to the plastic material.

FIG. 9 shows a further illustrative embodiment of a plastic retainer 516 having a tab 518 integrally formed with a plastic outlet port 514 of an in-tank filter. The tab 218 includes an axial aperture 524 with four lugs 534 arranged on the outer perimeter for achieving an adequate grip on the pump retention post. In the illustrated embodiment, the lugs 534 are shaped as partial truncated cones with a virtual apex of each cone located outside the tab 518 on the side of the first major surface 520 of the tab 518. With respect to the flow axis Z, the aperture 524 of this embodiment is wider in a radial direction than in a tangential direction. This shape preferably accommodates retention posts with a non-circular cross-section, such as a rectangular or oval cross-section.

While the lugs 534 extend along the entire axial thickness of the tab 518, the aperture 524 is beveled proximate the first major surface 520, thus forming a centering guide 536 for guiding a retention post proximate the first major surface 520. The cross-section of the aperture 524 continuously decreases from the first major surface 520 toward the second major surface 522. Due to the non-cylindrical shape of the retention post, an effective cross-section is preferably defined by a cross-section having the same shape as the retention post. Thus the effective cross-section is a cross-section that is mathematically similar to the retention post and only changes its scale based on the largest unobstructed cross-section of the same proportions.

FIGS. 10 and 11 illustrate how the effective cross-section depends on the cross-section of a retention post with which the retainer is matched.

Figures 10A, 10B:
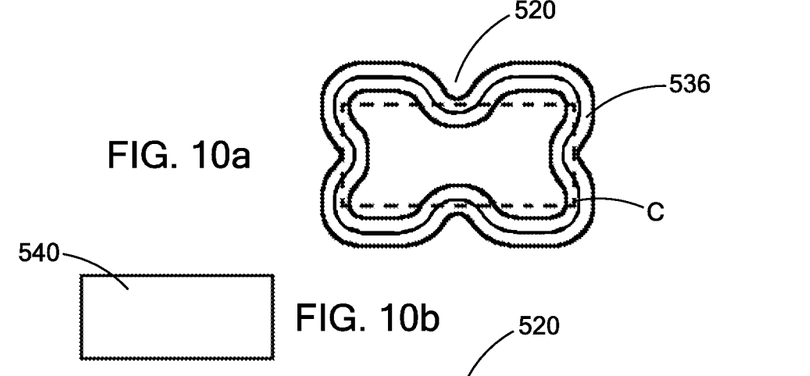
FIG. 10 illustrates the effective cross-sections of the embodiment of FIGS. 9 and 10 for a rectangular post.
Figure 10C:
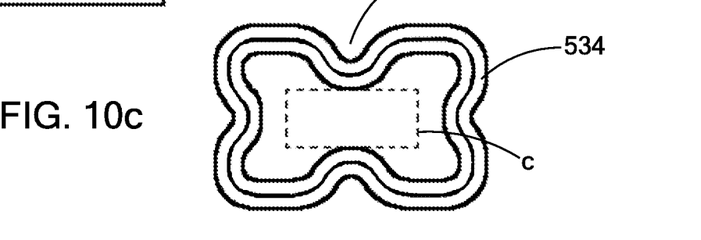

In FIGS. 10a, 10b, and 10c, the retainer 516 cooperates with a retention post with a rectangular cross-section 540 as indicated in FIG. 10b. Because the post cross-section 540 is rectangular, the effective cross-sections C and c indicated with broken lines in FIGS. 10a and 10c are rectangles with the same aspect ratios as the retention post cross-section 540. FIGS. 10a through 10c are all drawn in the same scale. As evident from FIG. 10a, the aperture 524 has a first effective cross-section C proximate the first major surface 520 that is larger than the post cross-section 540 shown in FIG. 10b. The centering guide 536 may or may not be configured to grip the retention post below the first major surface 520 as the post is inserted into the centering guide. Adjacent to the centering guide 536, between the centering guide 536 and the second surface 522, the effective cross-section is further gradually reduced to a resulting minimum effective cross-section c as indicated in FIG. 10c.

As evident from FIG. 10c, the lugs 534 create the effective cross-section c near the second surface 522 that is smaller than the effective cross-section C at the first major surface 520. As mentioned above, the narrowest effective cross-section c need not coincide with the second major surface 522. Advantageously, it is located at a distance from the first major surface 520, such that the effective cross-section C at the first major surface 520 is greater than the post cross-section 540 and continuously or gradually reduced to the smallest effective cross-section c. The effective cross-section C at the first major surface is larger than the post cross-section 540, while the minimum effective cross-section c is smaller than the post cross-section.

Figure 11A:
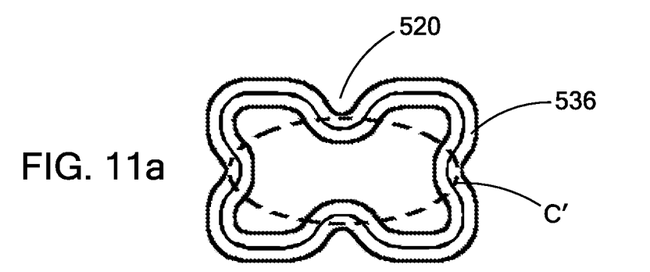
FIG. 11 illustrates the effective cross-sections of the embodiment of FIGS. 9 and 10 for an oval post.
Figures 11B, 11C:
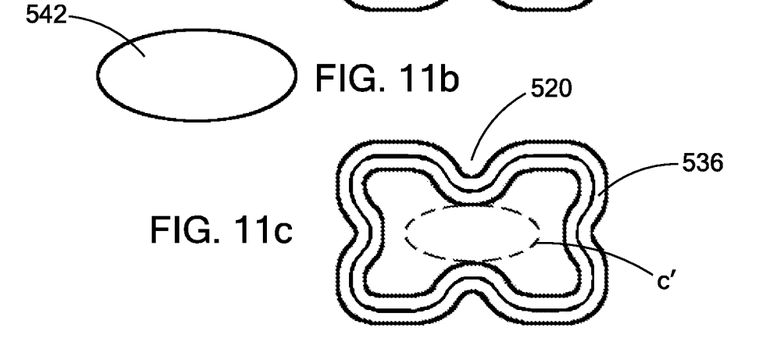

In FIGS. 11a, 11b, and 11c, the retainer 516 cooperates with a retention post with an oval cross-section 542 as indicated in FIG. 11b. Because the post cross-section 542 is oval, the effective cross-sections C' and c' indicated with broken lines in FIGS. 11a and 11c are rectangles with the same aspect ratios as the retention post cross-section 542. FIGS. 11a through 11c are all drawn in the same scale. As evident from FIG. 11a, the aperture 524 has a first effective cross-section C' proximate the first major surface 520 that is larger than the post cross-section 542 shown in FIG. 11b. The centering guide 536 may or may not be configured to grip the retention post below the first major surface 520 as the post is inserted into the centering guide. Adjacent to the centering guide 536, between the centering guide 536 and the second surface 522, the effective cross-section is further gradually reduced to a resulting minimum effective cross-section c' as indicated in FIG. 11c.

As evident from FIG. 11c, the lugs 534 create the effective cross-section c' near the second surface 522 that is smaller than the effective cross-section C' at the first major surface 520. The effective cross-section C' at the first major surface is larger than the post cross-section 542, while the minimum effective cross-section c' is smaller than the post cross-section.

A vast variety of differently shaped post cross-sections are all within the scope of the present invention, including concave post cross-sections, such as star-shaped cross-sections. Accordingly, apertures within the scope of the invention can include even greater variations regarding the shape of the aperture itself, the shapes and the number of the lugs, slopes built into the aperture, thickness of the tab, and more.

The invention may be embodied in other forms without departing from the spirit or novel characteristics thereof. The embodiments disclosed in this application are to be considered in all respects as illustrative and not limiting. Furthermore, details described in connection with one embodiment may be adapted to be implemented in a different embodiment. The scope of the invention is indicated by the appended claims rather than by the foregoing description; and all changes which come within the meaning and range of equivalency of the claims are intended to be embraced therein.

What is claimed is:

1. An in-tank fluid filter for a pump having an inlet fitting and a retention post with a post cross-section, the filter comprising:

a filter body made of porous material;
a plastic outlet port attached to the filter body for connecting the filter to the inlet fitting, the outlet port having a flow axis defined by an intended direction of fluid flow from the filter to the pump; and
a plastic retainer unitarily molded on the outlet port, the retainer comprising a tab extending in a plane perpendicular to the flow axis, the tab having a first surface facing the pump and a second surface facing away from the pump, the tab having an aperture for receiving the retention post, the aperture extending from the first surface to the second surface, the aperture having an effective cross-section at the first surface that is larger than the post cross-section, and the aperture having an effective cross-section smaller than the post cross-section in at least one radial plane intersecting with the flow axis between the first and second surfaces including the second surface.

2. The filter of claim 1, wherein the effective cross-section is continuously reduced from the first surface toward the second surface and reaches a minimum proximate the second surface.

3. The filter of claim 1, wherein the aperture has a tapered centering guide proximate the first surface.

4. The filter of claim 1, wherein the aperture has two or more lugs extending radially inward for reducing the effective cross-section.

5. The filter of claim 4, wherein the lugs are tapered so as to effect different effective cross-sections in different planes intersecting with the flow axis.

6. The filter of claim 4, wherein the lugs each have a contour that makes a point-shaped contact with the effective cross-section in at least one radial plane intersecting with the flow axis.

7. The filter of claim 4, wherein the lugs are distributed along the periphery of the aperture.

8. The filter of claim 4, wherein the lugs are truncated, partial cones.

9. The filter of claim 4, wherein the lugs have an inner contour adapted to the retention post.

10. The filter of claim 1, wherein the retainer is made of a plastic material with embedded reinforcement material.

11. The filter of claim 10, wherein the reinforcement material comprises at least one member of the group consisting of glass fibers and glass spheres.

12. The filter of claim 1, wherein the retainer is made of a thermoplastic, fluid-resistant material.

13. The filter of claim 12, wherein the thermoplastic, fluid-resistant material contains polyoxymethylene.

14. The filter of claim 1, wherein the retainer obtains a non-positive lock with the retention post by deformation of the retainer.

15. The filter of claim 14, wherein the deformation is at least in part elastic.

16. The filter of claim 1, wherein the aperture has a frustoconical centering guide proximate the first surface and a plurality of lugs proximate the second surface, the effective cross-section at the centering guide being larger than the post cross-section and decreasing in a direction from the first surface toward the second surface, the effective cross-section at the lugs being larger than the post cross-section proximate the centering guide and decreasing in the direction from the first surface toward the second surface to become smaller than the post cross-section remote from the centering guide.

17. The filter of claim 1, wherein the post cross-section is wider in one radial direction than in a radial direction perpendicular thereto and wherein the effective cross-section is defined as having mathematically similar proportions as the post cross-section.

18. The filter of claim 17, wherein the post cross-section is rectangular.

19. The filter of claim 17, wherein the post cross-section is oval.

* * * * *